June 3, 1941. W. S. HALSTEAD Re. 21,818

RADIO TRAFFIC CONTROL SYSTEM

Original Filed Sept. 28 1935 10 Sheets-Sheet 1

INVENTOR.
WILLIAM S. HALSTEAD
BY John B. Brady
ATTORNEY

RADIO TRAFFIC CONTROL SYSTEM
Original Filed Sept. 28, 1935 10 Sheets-Sheet 2
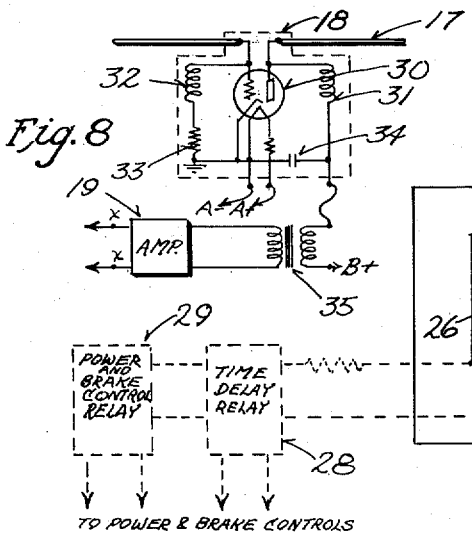
Fig. 8
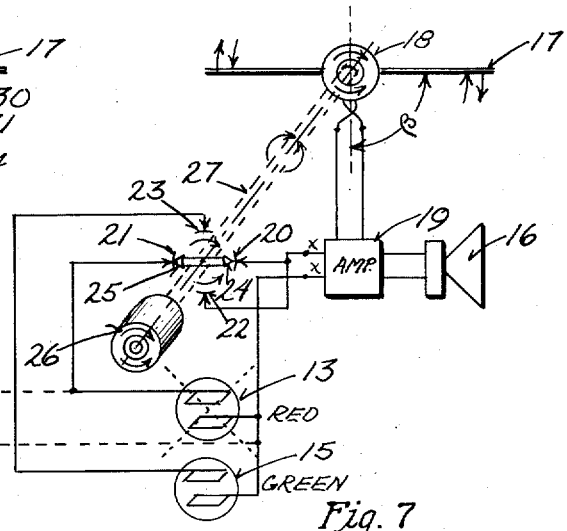
Fig. 7
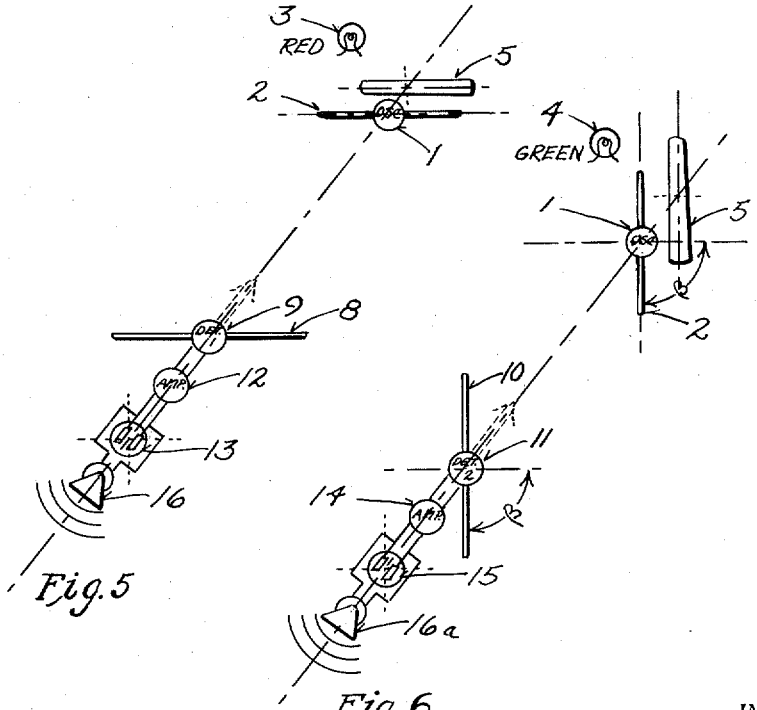
Fig. 5
Fig. 6
INVENTOR.
WILLIAM S. HALSTEAD
BY John B. Grady
ATTORNEY

RADIO TRAFFIC CONTROL SYSTEM

Original Filed Sept. 28, 1935 10 Sheets-Sheet 3

INVENTOR.
WILLIAM S. HALSTEAD
BY John B. Brady
ATTORNEY

RADIO TRAFFIC CONTROL SYSTEM

Original Filed Sept. 28, 1935 10 Sheets-Sheet 4

Inventor
WILLIAM S. HALSTEAD

By John B. Brady
Attorney

RADIO TRAFFIC CONTROL SYSTEM

Original Filed Sept. 28, 1935 10 Sheets-Sheet 5

INVENTOR
WILLIAM S. HALSTEAD
BY John O Grady
ATTORNEY

June 3, 1941. W. S. HALSTEAD Re. 21,818

RADIO TRAFFIC CONTROL SYSTEM

Original Filed Sept. 28, 1935 10 Sheets-Sheet 6

INVENTOR.
WILLIAM S. HALSTEAD
BY John B. Grady
ATTORNEY

RADIO TRAFFIC CONTROL SYSTEM

Original Filed Sept. 28, 1935 10 Sheets-Sheet 7

INVENTOR
WILLIAM S. HALSTEAD
BY
John B. Brady
ATTORNEY

RADIO TRAFFIC CONTROL SYSTEM
Original Filed Sept. 28, 1935 10 Sheets-Sheet 8
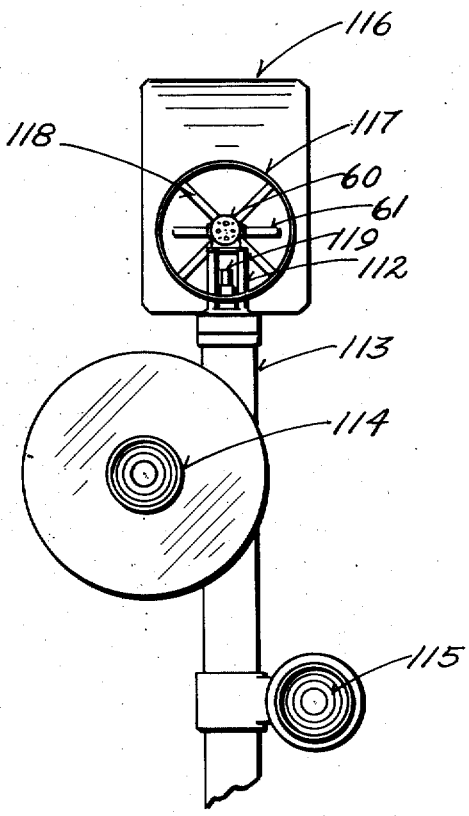
Fig. 23
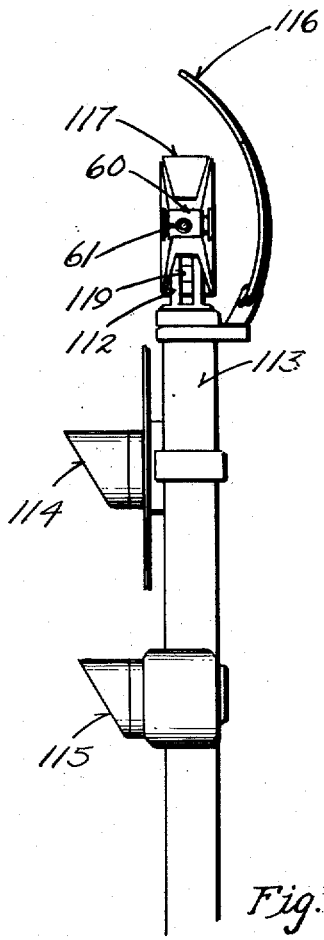
Fig. 24
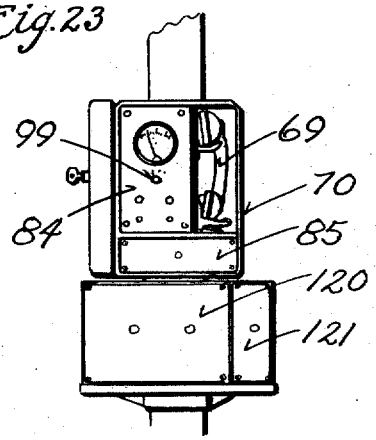
INVENTOR.
WILLIAM S. HALSTEAD
BY John B. Grady
ATTORNEY

RADIO TRAFFIC CONTROL SYSTEM

Original Filed Sept. 28, 1935 10 Sheets-Sheet 9

INVENTOR
WILLIAM S. HALSTEAD

BY

John B. Brady
ATTORNEY

June 3, 1941. W. S. HALSTEAD Re. 21,818

RADIO TRAFFIC CONTROL SYSTEM

Original Filed Sept. 28, 1935 10 Sheets-Sheet 10

Inventor
WILLIAM S. HALSTEAD

By John Q. Brady
Attorney

Reissued June 3, 1941

Re. 21,818

UNITED STATES PATENT OFFICE 21,818

RADIO TRAFFIC CONTROL SYSTEM

William S. Halstead, Huntington, N. Y., assignor of one-third to John B. Brady, Washington, D. C.

Original No. 2,131,042, dated September 27, 1938, Serial No. 42,703, September 28, 1935. Application for reissue August 3, 1940, Serial No. 351,074

20 Claims. (Cl. 177—337)

My invention relates, in general, to traffic control systems and is more particularly concerned with systems for controlling the movement of vehicular traffic by radio signalling means.

My invention is particularly applicable to traffic control systems in which colored lights or moving semaphore arms serve as signals for controlling the movement of traffic on various parallel or intersecting lanes, such as is the case in railroad and automobile traffic control systems respectively; but it will be readily understood that this particularization constitutes no limitation on the invention which may also be employed in many applications apart from that outlined.

Heretofore in the majority of traffic control systems it has been customary to employ colored lights or other visible signalling devices such as moving semaphore arms or discs to indicate to the operator of a moving vehicle that he should continue in his course, change speed, or stop at predetermined points. Since the efficiency of operation of such visual devices is subject to objectionable variations because of poor visibility commonly encountered in snow, rain, dust storms and fog wherein the range of visibility is seriously limited, the degree of control of such signaling devices is uncertain and in many cases entirely ineffective. It is well known that one of the major causes of railroad and highway accidents during storms has been through the lack of reception of a stop signal by the driver because of his restricted range of vision. With present automobile traffic control systems, especially, many accidents have been caused by inability of the driver to see the control light in time because of heavy traffic which requires the full attention of the driver, unfamiliarity with the location of the signals, confusion with other lights, or the blinding effects of sunlight in late afternoon when on a highway leading in the direction of sunset.

It is a primary object of the present invention to provide dependable and comparatively simple means by which the illustrative directional quasi-optical characteristics of wave propagation from an ultra-high frequency radio transmitter cooperatively associated with a traffic signal control device are employed to effect selective operation of a predetermined signal connected with an ultra-high frequency radio receiver installed in a moving vehicle proceeding towards the radio signal source.

It is an additional object to my invention to provide means by which predetermined changes in the characteristics of a polarized quasi-optical radio wave are affected in correlation with predetermined changes in the visual signals of a traffic control device employing colored lights or moving signal indicating media.

Another object of my invention is to provide means by which predetermined changes in the modulating characteristics of a polarized ultra-high frequency radio wave are effected in correlation with predetermined changes in the character of visual signals of a traffic control device employing colored lights or other visible signalling media.

It is a further object of my invention to provide a uni-directional ultra-high frequency radio traffic control system which will be unaffected by atmospheric conditions and which will cause no interference with communication services such as television and broadcasting on substantially the same or adjacent ultra-high frequency radio channels.

Another object of my invention is to provide a simple construction of directionally selective ultra-high frequency radio receiving apparatus adapted to be mounted on a moving vehicle for cooperation with directional ultra-high frequency radio transmission apparatus synchronized in operation with a traffic light or semaphore system for reproducing in the vehicle, visual and audible indications corresponding to the character of the visual signal from the traffic light or semaphore.

A further object of my invention is to provide a construction of ultra-high frequency radio transmitting equipment which may be readily mounted on conventional types of traffic control devices without the alteration of such devices, for the purpose of emitting radio control signals to operate signal indicating devices within automobiles, railroad trains, or other moving vehicles.

A still further object of my invention is to provide means whereby telephonic traffic control messages, police department warnings, highway directions, standard time signals, advertising, or other intelligence may be transmitted to the interior of a moving vehicle simultaneously with the emission of traffic signals by an ultra-high frequency radio transmitter.

Other and further objects of my invention reside in the constructional and circuit arrangements for directional ultra-high frequency radio signal emitting devices associated with traffic control devices and ultra-high frequency radio signal receiving devices installed on a railroad train, automobile or other vehicle, as set forth fully in the specification hereinafter following, and by reference to the accompanying drawings in which:

Figure 1 is a front elevational view of a railroad signal semaphore and light system with support therefor, depicted herewith to illustrate one embodiment of my invention, showing the ultra-high frequency radio wave generator, and associated dipole antenna unit included in my invention mounted on the movable signal semaphore arm to effect angular displacement of the longitudinal axis of the dipole antenna with a corresponding angular movement of the semaphore arm, thereby effecting changes in the polarization characteristics of the emitted radio wave in accordance with correlated changes in the character of the railroad signal.

Figure 5 is a schematic diagram in simple isometric projection, to illustrate the operative coordination between the horizontal position of the dipole antenna when the semaphore arm is in the horizontal "stop" position, and the horizontal receiving dipole connected with an ultra-high frequency detector and signal indicating device installed in a moving vehicle, to give visual and audible indication therein of the character of the semaphore signal.

Figure 4:
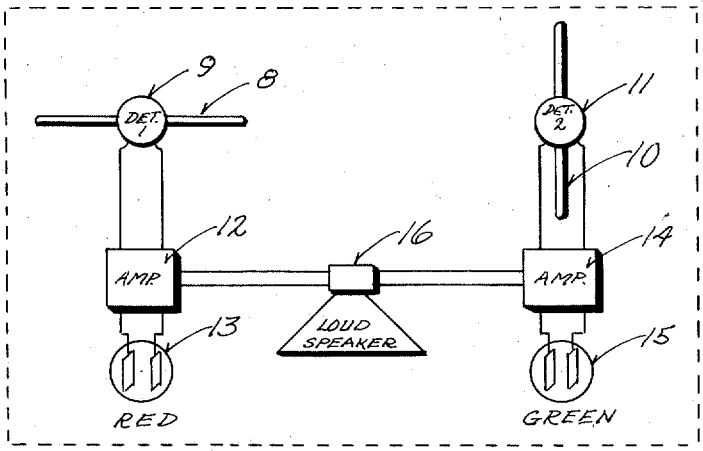
Figure 4 is an elementary schematic diagram of one form of polarized microwave radio receiver and associated signal indicating system embodied in my invention for use in cooperation with the polarized microwave transmitter of the preceding figures, and shown herewith to aid in illustrating the principle of operation of the system and devices of my invention.

Figure 6 is a schematic diagram of the vertical receiving dipole with associated detector and signal indicator shown in Figure 4, illustrating the effective reception of a vertically polarized ultra-high frequency signal by the vertical receiving dipole when the transmitting dipole is in an approximately vertical position corresponding to the vertical or "go" position of the semaphore arm, as will be explained hereinafter.

Figure 7 is a schematic diagram of one embodiment of an ultra-high frequency radio receiving system, installed in the cab of a locomotive or other moving vehicle, which employs automatic means to change the angular position of the longitudinal axis of the receiving dipole with respect to the position of the transmitting dipole, and simultaneously to select particular segments of a commutator operatively coordinated with particular positions of the receiving dipole, thereby providing selective control of signal lights in the vehicle, or automatic power and brake control if desired, in accordance with the character of the semaphore signal as will be explained hereinafter.

Figure 8 is a circuit diagram of one form of ultra-high frequency detector circuit employed in a receiving system of the type shown in Figure 7.

Figure 9:
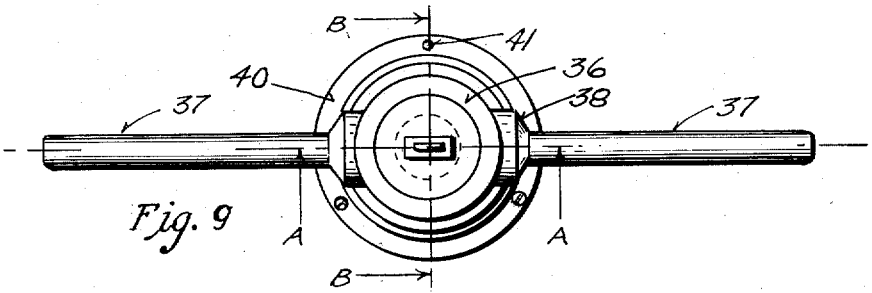

Figure 9 is a plan view of one form of ultra-high frequency oscillator and dipole antenna unit, enclosed in a weatherproof housing, as embodied in my invention.

Figure 10:
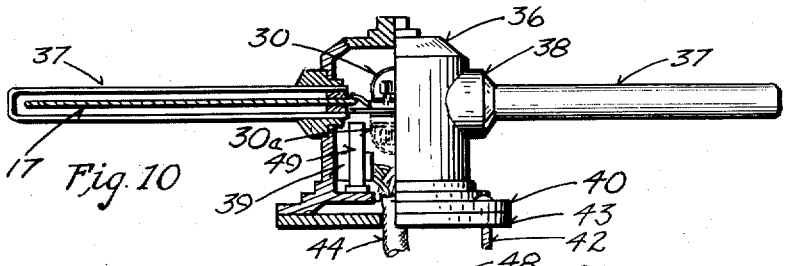

Figure 10 is a front elevational view of the device shown in Figure 9, a vertical cross section being taken along lines A—A and B—B as shown, to illustrate the preferred arrangement of parts within the protective housing of said oscillator and dipole antenna.

Figure 11:
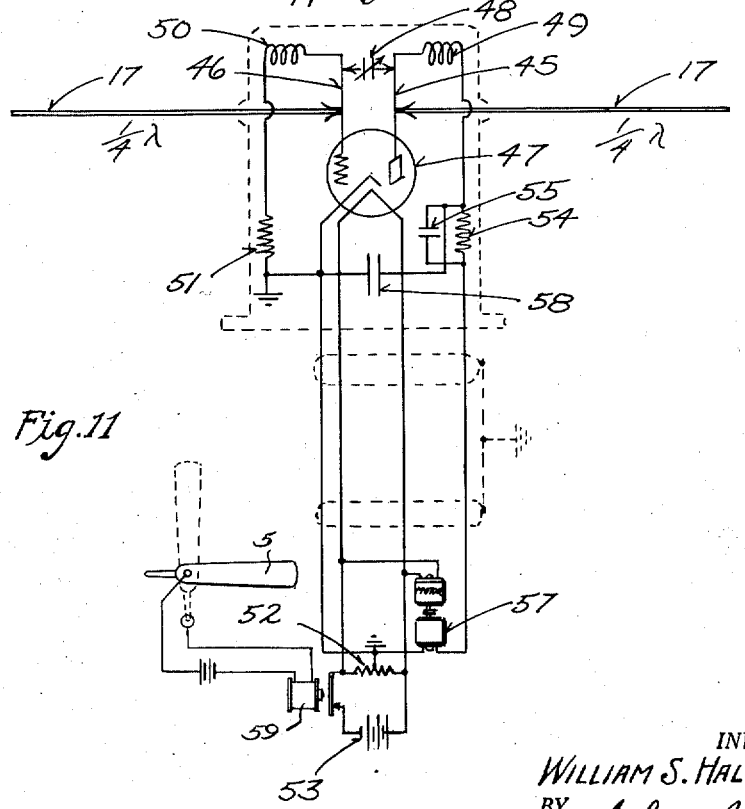

Figure 11 is a circuit diagram of the ultra-high frequency oscillator and dipole antenna embodied in the unit shown in Figures 9 and 10.

Figure 12:
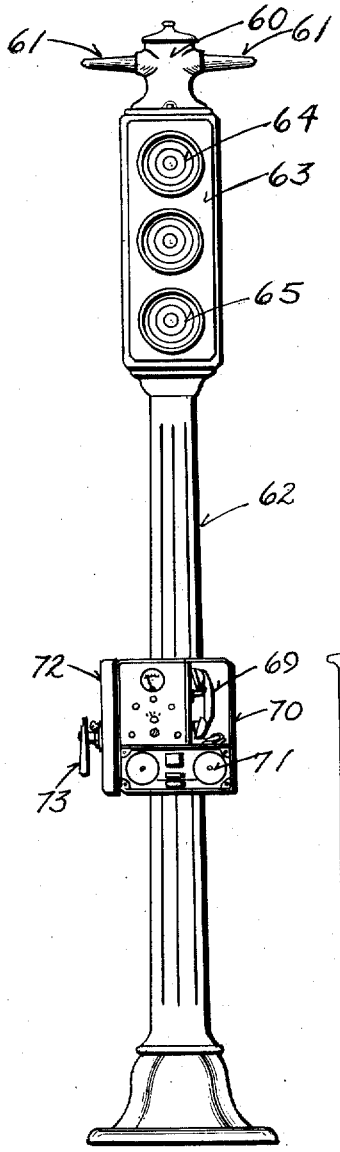

Figure 12 is a front elevational view of a modification of the ultra-high frequency radio traffic control device previously illustrated, showing the employment of a fixed ultra-high frequency oscillator unit having a horizontal dipole antenna disposed on a conventional form of automobile traffic control housing in which signal lights are employed to control the movement of traffic at intersecting streets, the ultra-high frequency oscillator and dipole antenna unit in this case being installed on the top of the traffic light housing, with the longitudinal axis of the horizontal dipole extending in a direction at right angles to the direction of traffic controlled by the signal lights so as to effect correlated directional radio signal control of traffic as hereinafter explained. The same figure also illustrates the cooperative combination of a telephone system and a repeating telegraphone or other continuously operating sound-record reproducing means with the ultra-high frequency oscillator and dipole antenna unit to effect, in addition to the transmission of traffic control signals, the transmission of police messages and other intelligence to the interior of automobiles or other moving vehicles equipped with the ultra-high frequency receiving apparatus embodied in the invention.

Figure 13:
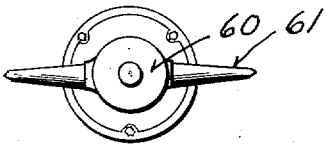

Figure 13 is a plan view of the ultra-high frequency oscillator and dipole antenna unit disposed on the top of the traffic control device illustrated in Figure 12.

Figure 14:
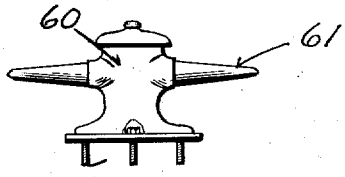

Figure 14 is a front elevational view of the ultra-high frequency oscillator and dipole antenna unit of Figures 12 and 13, showing, in this case, the demountable attaching means employed in this embodiment of the invention for securing the ultra-high frequency transmitting unit on the top of a conventional traffic light housing.

Figure 15:
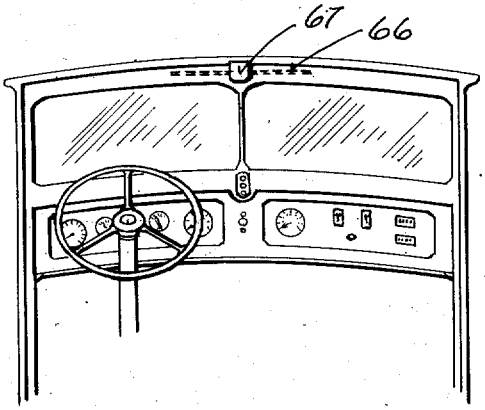

Figure 15 illustrates, in an elevational view, the interior of an automobile equipped with the directionally selective ultra-high frequency receiver and associated signal indicative devices embodied in the invention, and shows in particular a preferred location of a horizontal receiving dipole and ultra-high frequency detector on the front of the vehicle.

Figure 16:
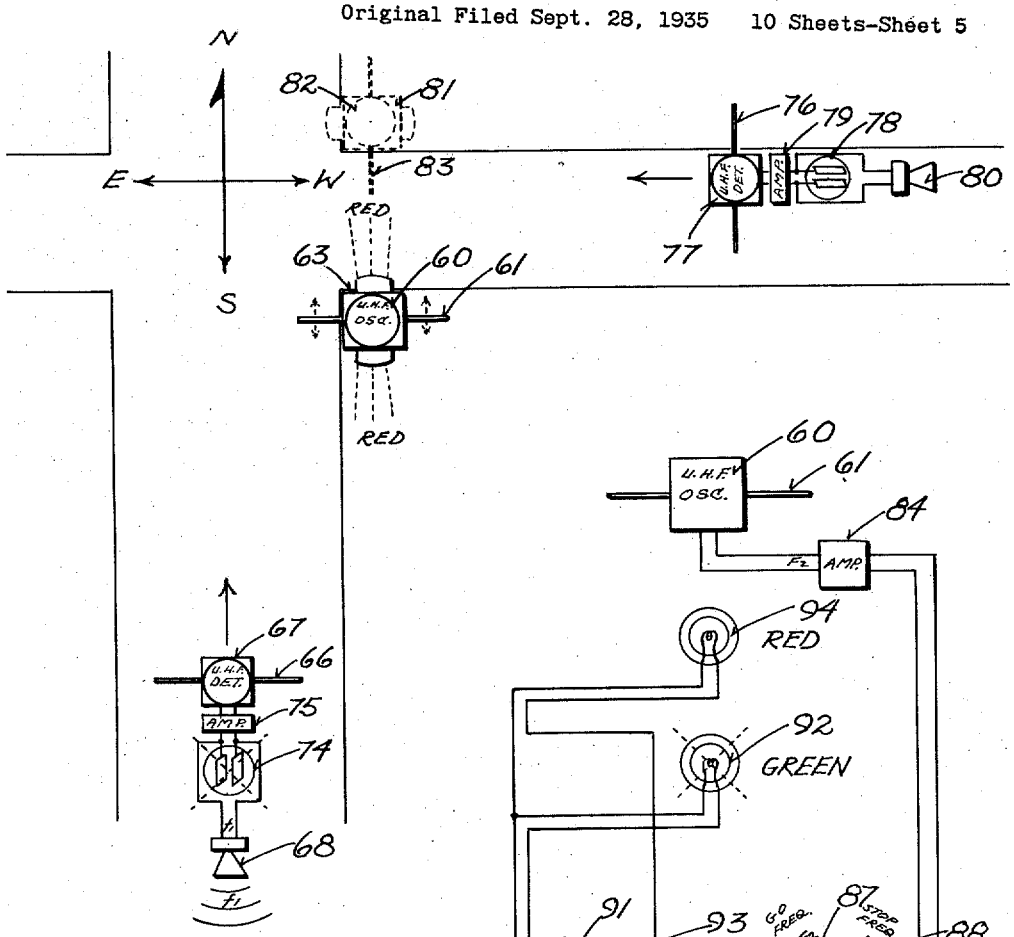

Figure 16 is a schematic diagram illustrating the directionally selective mode of operation of the ultra-high frequency traffic control system when employed in connection with traffic lights located at a street intersection.

Figure 17:
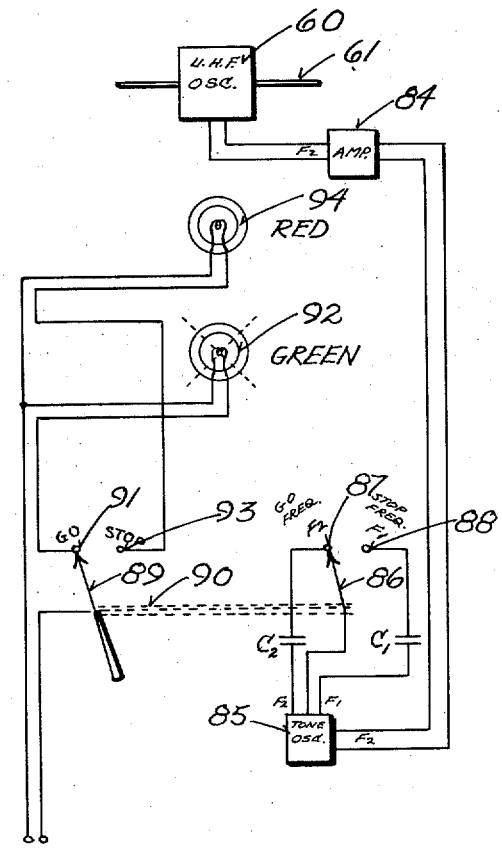

Figure 17 is a schematic diagram of a traffic control signal light circuit and the coordinated ultra-high frequency signal control circuits, illustrating the use of a plurality of modulating frequencies to modulate the radio energy wave emitted by the ultra-high frequency transmitter, each modulating frequency being indicative of a particular color of its coordinated traffic light.

Figure 18:
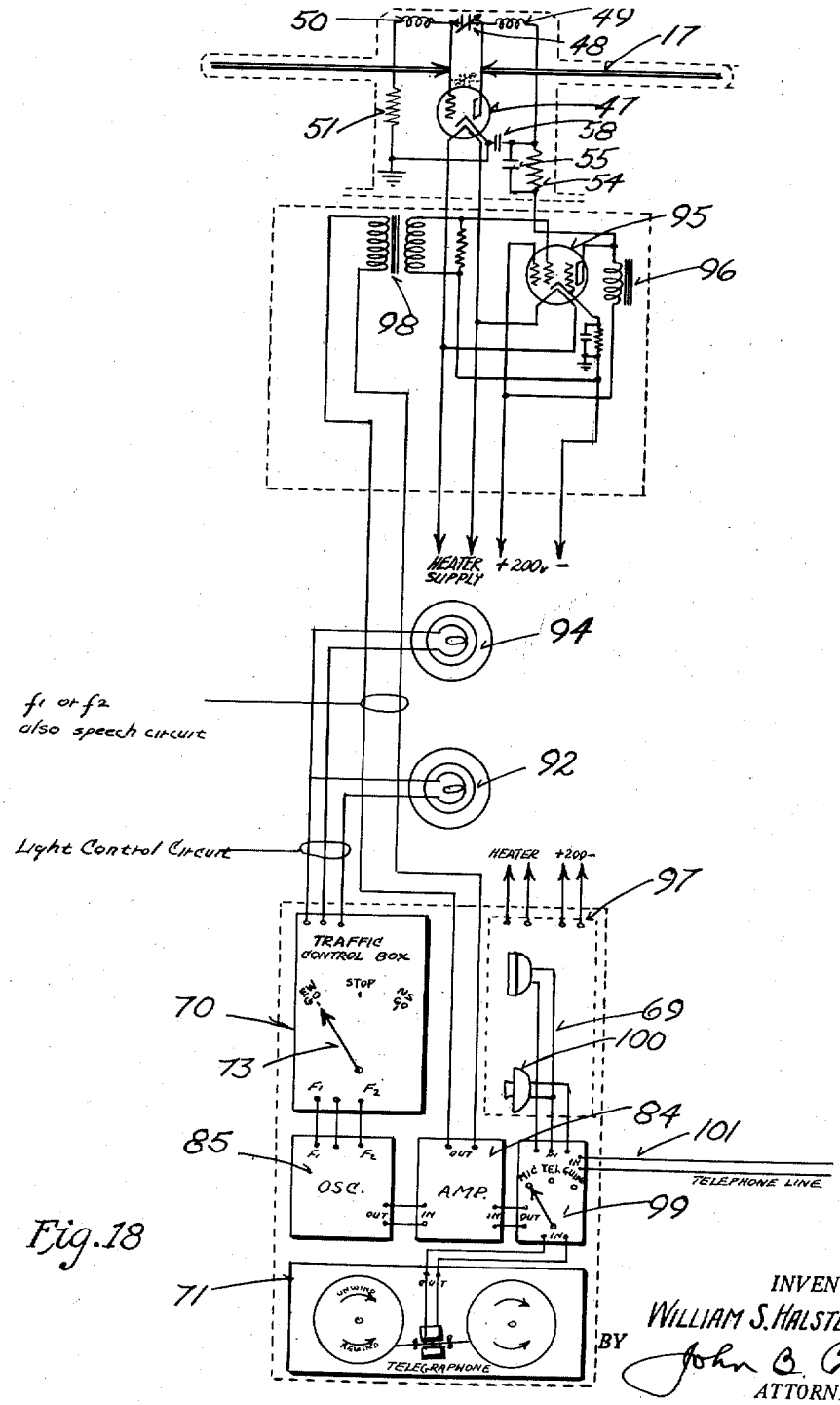

Figure 18 is a circuit diagram of an ultra-high frequency oscillator and dipole antenna unit of the type employed in the illustrated embodiment of the invention, together with a schematic diagram of the associated ultra-high frequency modulating and coordinated traffic control circuits. This figure also shows the cooperative combination of a telephone system and a repeating telegraphone to effect speech modulation of the emitted ultra-high frequency signal.

Figure 19:
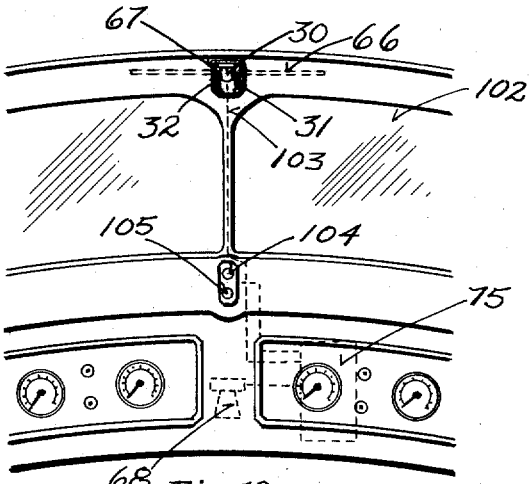

Figure 19 is a front elevational view of the upper portion of an automobile to illustrate the preferred disposition of a horizontal receiving dipole and detector unit on the exterior of the vehicle, the installation in this case being located on the front of the vehicle just above the windshield, which location has distinct functional advantages as will be explained hereinafter.

Figure 20:
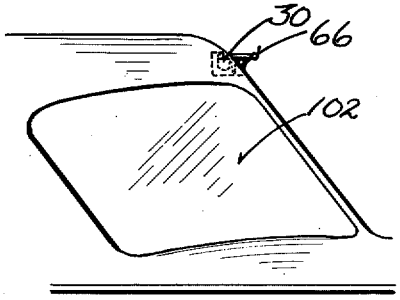

Figure 20 is a side elevation of the same vehicle showing the horizontal receiving dipole and detector unit illustrated in front elevation of Figure 19.

Figure 21:
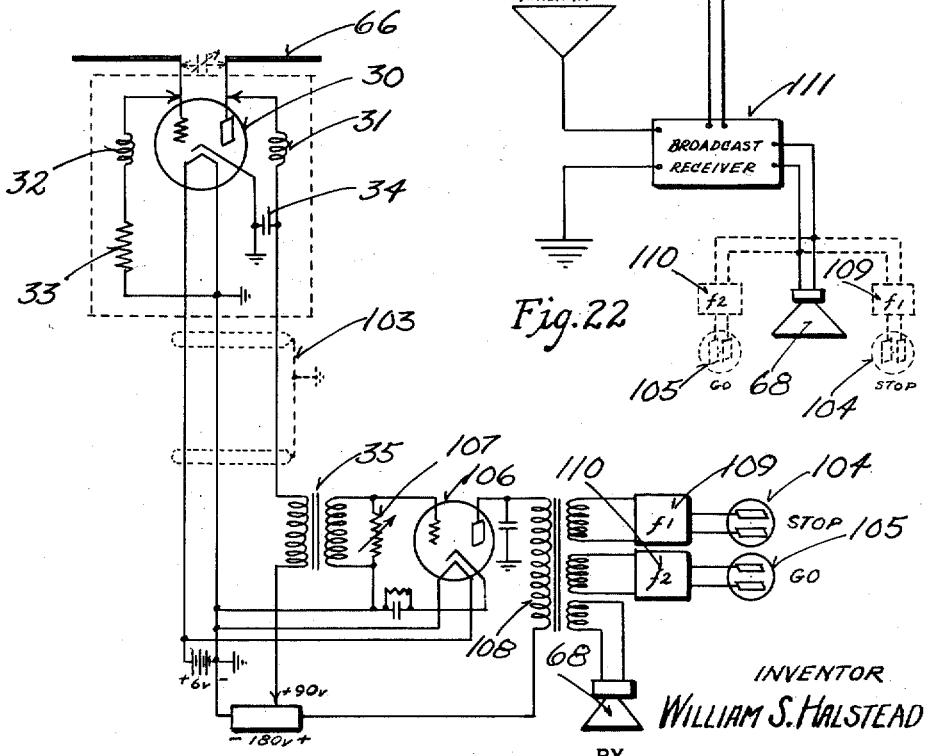

Figure 21 is a circuit diagram of one form of ultra-high frequency receiver, amplifier, and associated signal indicating means employed in a vehicle to give audible and visual indication of the character of the traffic control signal ahead of the vehicle.

Figure 22:
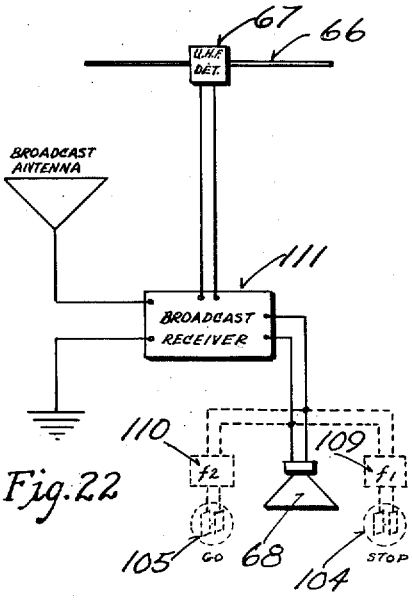

Figure 22 is a schematic diagram of a simplified modification of the ultra-high frequency receiving apparatus illustrated heretofore in which an ultra-high frequency detector unit is employed in connection with a conventional automobile broadcast receiver to give indication of the character of a traffic control signal.

Figure 23 is a front elevational view of a railroad signal equipped with a modification of the ultra-high frequency signalling system heretofore illustrated, wherein an ultra-high frequency oscillator and horizontal dipole antenna are disposed in a fixed position on the top of the signal support in front of a metallic reflector to effect unidirectional transmission of the ultra-high frequency signal. Figure 23 also shows the cooperative combination of a telephone circuit with the ultra-high frequency oscillator whereby traffic instructions or other intelligence may be transmitted to the interior of a locomotive cab in addition to the transmission of light control signals.

Figure 24 is a side elevation of the ultra-high frequency oscillator, dipole antenna, reflector, and signal light device shown in Figure 23.

Figure 25:
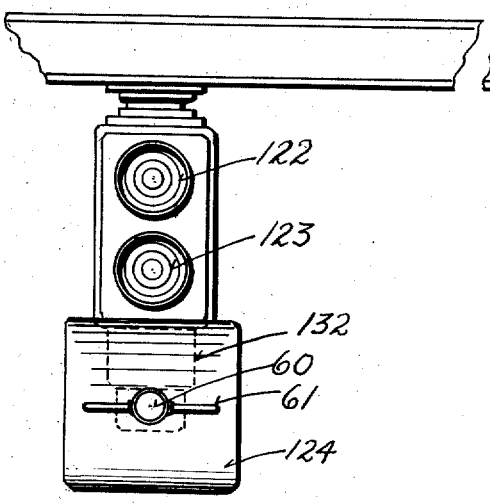

Figure 25 is a front elevational view of a railroad signal light equipped with an ultra-high frequency oscillator having a horizontal dipole antenna disposed in front of a reflector to control the response of a horizontally polarized ultra-high frequency receiver and associated signal indicator devices located in the cab of a locomotive proceeding on a track controlled by the depicted signal.

Figure 26:
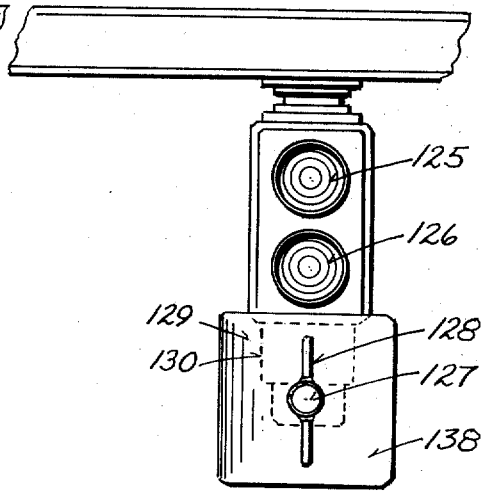

Figure 26 is a front elevational view of another signal light equipped with an ultra-high frequency oscillator having a vertical dipole antenna disposed in front of a reflector for controlling the response of a vertically polarized ultra-high frequency receiver and associated signal indicating devices located in the cab of a locomotive proceeding on a parallel track and in the same direction as that of the locomotive controlled by the signal device in Figure 25.

Figure 27:
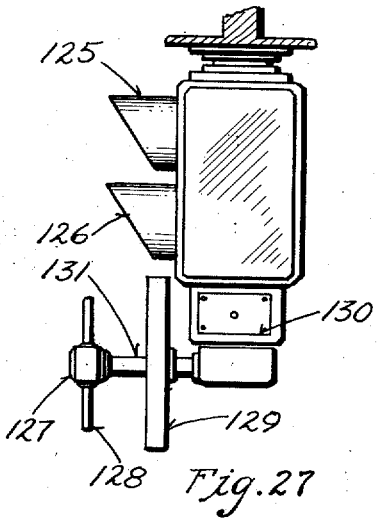

Figure 27 is a side elevational view of the railroad signal light and ultra-high frequency signal device illustrated in Figure 26.

Figure 28:
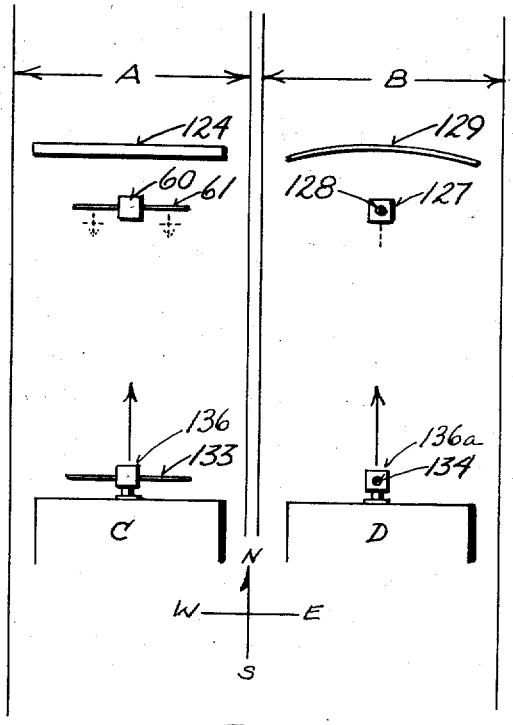

Figure 28 is a schematic diagram illustrating the unidirectional operation of the two ultra-high frequency signal devices illustrated in Figures 25 and 26, one of the ultra-high frequency generators being equipped with a horizontal dipole antenna, the other ultra-high frequency generator being equipped with a vertical dipole antenna, thereby effecting selective control of the received signals in the cabs of the two locomotives proceeding on parallel tracks and in the same direction.

Figure 29:
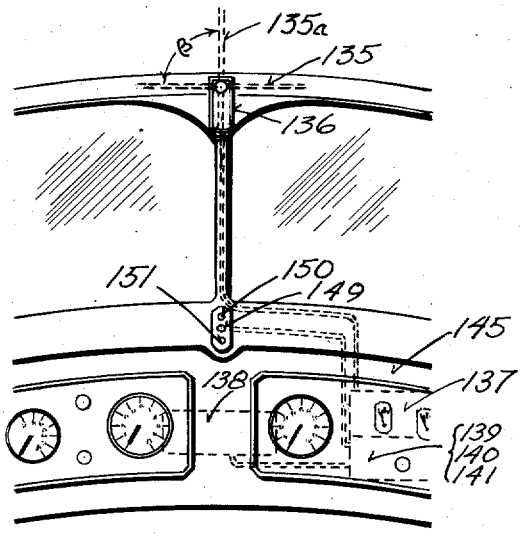

Figure 29 is an elevational view of the interior of a locomotive cab equipped with the ultra-high frequency signal receiving devices embodied in the invention, wherein is illustrated the preferred disposition of the ultra-high frequency detector unit and adjustable receiving dipoles at the top of the cab, the ultra-high frequency receiver and loud speaker at a location adjacent to the instrument panel, and an array of signal lights adjacent to the panel, substantially in the line of vision of the operator of the locomotive.

Figure 30:
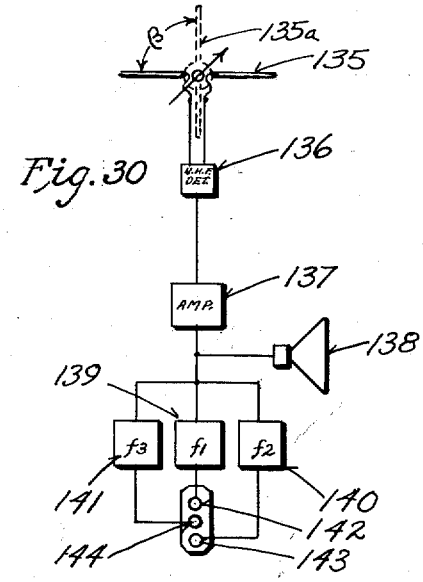

Figure 30 is a schematic diagram of the ultra-high frequency receiving dipole, detector, amplifier, loud speaker, electric wave filters and the signal lights associated with each of the filters for selectively effecting the operation of a particular signal or signals in the cab of a locomotive, in accordance with the reception of a particular ultra-high frequency signal correlated with the different colors of the signal light.

Figure 31:
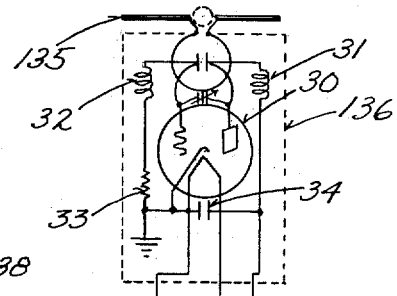
Figure 31:
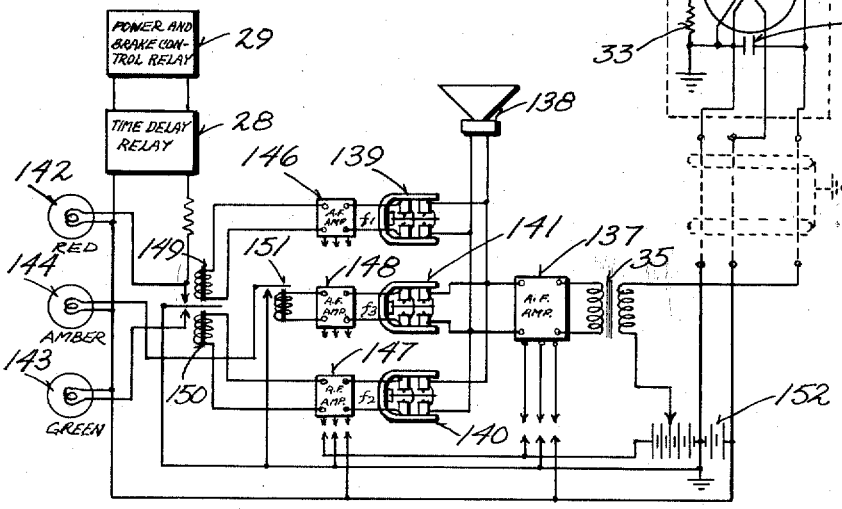

Figure 31 is a circuit diagram of an ultra-high frequency receiver and associated electric wave filters for effecting the selective operation of one or a plurality of signal lights installed in the cab of locomotive in accordance with the particular modulating frequency or frequencies of the received ultra-high frequency signal.

Figure 1:
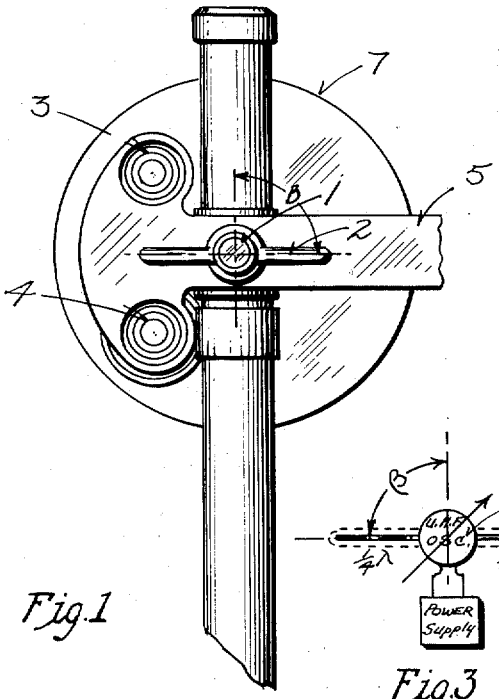
Figure 2:
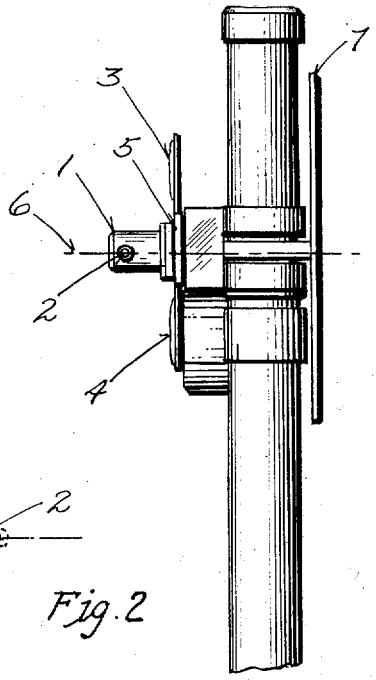
Figure 2 is a side elevational view of the same signal semaphore with the ultra-high frequency oscillator and dipole antenna disposed in the position shown in Figure 1.

Referring to the drawings in detail, wherein like reference characters indicate corresponding parts throughout the several views, each form of the invention illustrated herewith embodies quasi-optical radio wave generating means such as provided by an ultra-high frequency, radio oscillator, shown at 1, Figures 1 and 2, combined with a directional polarized wave radiator, such as a dipole antenna 2 to operate in combination with and in correlation with the traffic control signals of a railroad, automobile or other signal system employing lights of different colors such as provided by lenses 3 and 4, a moving semaphore arm 5, or other signalling media to effect transmission of traffic control signals to the interior of locomotives, automobiles or other moving bodies equipped with microwave signal receiving and indicating means embodied in the system of the invention.

In the particular embodiment of the invention shown in Figure 1, the ultra-high frequency oscillator, 1, and the dipole radiator, 2, are assembled as a single coaxial unit, the unit being so disposed on the semaphore arm 5, that a common rotational axis, 6, is effected, as is illustrated in Figures 1 and 2. A metallic shield, 7, may be employed behind the semaphore and ultra-high frequency oscillator unit as shown to effectively prevent the transmission of the ultra-high frequency signal in a direction opposite to that of the projected light rays from the traffic signal.

Figure 3:
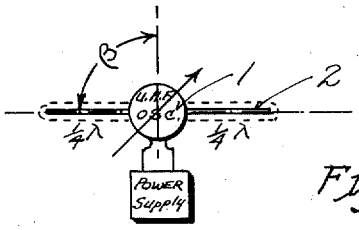
Figure 3 is an elementary schematic diagram of the ultra-high frequency oscillator and dipole antenna, illustrating the degree of angular rotation effected by the longitudinal axis of the antenna in accordance with similar angular changes in the signalling positions of the semaphore arm, thereby effecting changes in the polarization characteristics of the emitted wave.

In the particular embodiment illustrated herewith the shield, 7, takes the form of a sheet metal disc, but it is obvious that other forms and types of shields or reflectors may be employed in lieu thereof. In the embodiment of the invention shown herewith ultra-high frequency oscillator unit, 1, is secured to the semaphore arm, 5, so that when the arm is in the horizontal position shown in Figure 1 the longitudinal axis of the dipole, 2, also extends in a horizontal direction. It is evident, from the illustration of Figure 1, that when the semaphore arm, 5, moves upward through angle $\beta$ towards a vertical position, the dipole, 2, also moves through the same angle, as shown in Figures 1 and 3.

In the particular embodiment of the invention depicted in Figures 1 and 2 the heater and anode power supply for operation of the ultra-high frequency oscillator may be provided by a storage battery and a small battery-driven alternator, illustrated in subsequent figures. Since no modulator or amplifier tubes need be employed in this particular embodiment of the invention wherein the oscillator is self-modulated by the alternator supply, the comparatively minute current drain of an intermittently-operating ultra-high frequency oscillator permits extended operation of the microwave transmitter by a single storage battery.

As is well known in the radio art, an ultra-high frequency dipole radiator when disposed in a horizontal position as shown in Figure 1, will emit a radiant energy wave having horizontally polarized characteristics. If a horizontally disposed receiving dipole, shown at 8, Figures 4 and 5, installed on the front of a locomotive, approaches the horizontally disposed and parallel transmitting dipole, 2, Figures 1 and 5, the associated ultra-high frequency detector, 9, will supply a received signal of maximum amplitude to amplifier 12, thereby effecting visual actuation of a "stop" signal indicator, such as a red neon light, 13, and audible energization of loud speaker 16. Simultaneously, ultra-high frequency detector, 11, Figure 4, connected to a vertically disposed dipole, 10, installed on the front of the same locomotive, will deliver a signal of minimum amplitude to its amplifier, 14, and a green signal indicator light, 15, by reason of insufficient energization, will not be visibly actuated. When, on the other hand, the dipole radiator, 2, as shown in Figure 6 is in a substantially vertical position, corresponding to the vertical "go" position of the semaphore arm, 5, the emitted ultra-high frequency will have vertically polarized characteristics and the vertical receiving dipole 10, Figure 6, will deliver maximum wave energy to its associated detector circuit, 11, thereby effecting, as explained heretofore, the visual actuation of green light 15. Simultaneously, as explained heretofore, red light 13 will not be visibly actuated. Novel means are thus provided by which discrimination between two ultra-high frequency traffic control signals is effected by virtue of differences in the plane of polarization of the ultra-high frequency radio wave, each plane of polarization being correlated with a particular signal of the traffic controlling semaphore.

In addition to the selective actuation of visual signals 13 and 15 as described heretofore, loud speaker 16, shown in Figure 4, connected to the amplifiers 12 and 14, will emit an audible warning signal in the cab of the locomotive to inform the driver of the proximity of a signal ahead of the train. As long as the locomotive equipped with the ultra-high frequency receiving apparatus embodied in the invention is in front of the semaphore the ultra-high frequency traffic signal will be received in the cab. Once the locomotive has passed the semaphore, however, there will be an abrupt termination of the signal in the cab since the uni-directional quasi-optical wave propagation characteristics of the antenna system limit its field to the area in front of the semaphore. The unique directional characteristics of the ultra-high frequency system therefore preclude the possibility that a train proceeding in an opposite direction, for example, to the south, will receive the ultra-high frequency signal intended for a northbound train. Should the southbound locomotive be in front of the signal set for the northbound train, the shielding effect of the locomotive itself is sufficient to prevent the reception of the ultra-high frequency signal by the receiver other than that for which the signal was intended, since it is assumed that the receiving dipole in each case will be installed at the front of the cab below the top of or on the front of the locomotive.

It is pointed out that ordinary short wave radio transmitters and receivers would not efficiently effect the purpose of the present embodiment of the invention since short waves above several meters in wavelength lose many of the quasi-optical characteristics possessed by the ultra-high frequency system described herein. Moreover, the size of an efficient antenna required by a transmitter operating on wavelengths above several meters would be sufficiently great to preclude its installation and use as described in connection with the present embodiment of the invention. It will be understood therefore that the illustrative system of my invention is intended for operation with ultra-high frequency waves of approximately 10 cm. to 1 m. in length, which have the quasi-optical characteristics prescribed.

In this connection also it might be noted that limitation of the range of the ultra-high frequency transmitter is effected quite simply, and largely for the reason that the radiation pattern of the particular type of low power transmitter involved has comparatively sharp termination fringes. The limits of the radiation pattern for the transmitter in any location are determined and regulated with a standard receiver adjusted to effect light control above a certain threshold signal value. Thus, only receivers within a definitely limited area with respect to the transmitter will respond sufficiently to effect the desired control function. In addition, as shown hereinafter, controlled relays responsive only to a single maximum signal and not to other signals of lesser intensity, which might be received at the same time may be used in the receiver to insure reception of the proper traffic signal.

In a modification of the ultra-high frequency receiving system, heretofore described, the means shown in Figure 7 may be employed to effect selection of red or green signal indicators, 13 and 15, respectively. In this modification a single dipole antenna 17, which may be moved back and forth through angle $\beta$, is used. A detector 18 and an amplifier, 19, whose output is connected as shown through opposite and coacting commutator segments, 20—21 and 22—23, respectively and movable segment selecting brushes 24 and 25 to red and green lights, 13 and 15, respectively is arranged as shown. An electric motor, 26, may be employed to slowly rotate through angle $\beta$ insulated shaft 27 to which are secured brushes, 24 and 25 and the dipole antenna, 17. When read in connection with the foregoing description of the manner of operation of the system and the illustrations of Figures 5, 6 and 7 in particular, it will be understood that when the receiving dipole, 17, of Figure 7 is in the horizontal position a horizontally polarized ultra-high frequency signal from a horizontal transmitting dipole will be received with maximum intensity by detector, 18, and associated amplifier, 19, rendered audible by loud speaker, 16 and, by virtue of the disposition of the commutator segment selective brushes 24 and 25 which effect electrical contact between segments 20 and 21, the signal lamp 13, correlated with segments 20 and 21 will be energized and visually actuated. It is evident from the diagram of Figure 7 that so long as the commutator segment selective brushes 24 and 25 provide contact between coacting segments 20 and 21, only the red lamp, 13, can be actuated, since no electrical contact is effected between segment 22, and segment 23, which is connected to the green lamp, 15. When the receiving dipole 17 is rotated through an angle $\beta$ to the vertical position, the received signal from the horizontal transmitting dipole, 2, will be of minimum intensity in the detector circuit, and consequently neither signal indicator lamp, 13 nor 15, will be actuated. Inasmuch as the receiving dipole is slowly moved back and forth through angle $\beta$, the operator of the locomotive will see intermittent flashes of red light 13 in the cab as the locomotive approaches the semaphore set in the horizontal stop position. On the other hand, if the semaphore arm and associated transmitting dipole are set in the vertical or "go" position, detector 18 will receive the vertically polarized ultra-high frequency signal with maximum intensity when the receiving dipole 17 is in the vertical position. Electrical contact simultaneously is made between coacting segments 22 and 23, thereby providing energizing voltage for the green indicator light 15. The red light, 13, will not be energized so long as the semaphore arm is in the vertical position, since substantially no effective signal will be received by detector 18 when the receiving dipole 17 is in a horizontal position, thereby precluding the possibility of energizing the red light 13 sufficiently for its visible actuation. It is obvious that many modifications of the principle of operation of the system heretofore described are possible within the scope of the invention. In lieu of the movable dipole receiving antenna as described, fixed dipoles extending at right angles to each other may be employed and signal selection effected by intermittently connecting each of the dipoles to the detector, and simultaneously providing connection with the signal indicating device associated with a particular dipole. It is also obvious that the received signal may be used automatically to actuate the power and brake control system of the train as is schematically illustrated in dotted lines in Figure 7 by the provision of a timing device, 28, connected with a power and brake control relay, 29, both shown connected to the stop circuit of indicator lamp 13. Means are thus provided by which a train may be automatically stopped within a predetermined time after it has passed a stop signal.

It is also understood that many circuit modifications of the ultra-high frequency receiver and transmitter are possible within the scope of the invention, and many different types of detecting and oscillating circuits may be employed. One present preferred ultra-high frequency detector circuit is shown in Figure 8 in which the two halves of a receiving dipole are connected, as illustrated, to the anode and grid of an ultra-high frequency detector tube 30. Radio frequency chokes 31 and 32 are employed in series in the anode and grid circuits, respectively. A resistor, 33, is connected in series with grid choke, 32, to ground, to which is also connected the cathode and one side of the heater circuit of the tube as shown. A condenser, 34, is shunted between the anode circuit and the cathode as illustrated. The anode circuit of the detector is connected in conventional fashion through the primary windings of an amplifying transformer, 35, to a source of E. M. F. The secondary of transformer, 35, is connected to amplifier 19, as shown.

The mechanical arrangement of both ultra-high frequency detector unit and transmitting unit may be identical if desired. One preferred mechanical arrangement of an ultra-high frequency receiving or transmitting unit is shown in Figures 9 and 10 in which a cylindrical weatherproof housing, 36, fabricated of porcelain, glass, Bakelite or other suitable material, is provided to completely enclose ultra-high frequency tube 30 used as a microwave detector in this case, and its associated detector circuit elements such as chokes, 31 and 32, resistor, 33, and other parts. The dipole antenna, 17, also is enclosed in a weatherproof cylindrical housing, 37, fabricated of non-conducting material such as porcelain, glass or other suitable material, which is secured to the housing, 36, by means of insulating bushings or sleeves 38. A resistor, 39, Figure 10, may be employed if desired to provide sufficient heat to the interior of the dipole and tube housing to prevent formation of excessive accumulations of ice or moisture, the assembled unit being so constructed that warm air from the interior of tube housing, 36, may circulate within the dipole housing, 37. In the preferred arrangement illustrated herewith, the tube, 30, is so disposed in the central portion of housing, 36, that the anode and grid leads are substantially in line with the ends of the dipole thereby effecting a highly desirable symmetrical and compact disposition of all parts carrying ultra high frequency currents. It will be observed from the illustrations that the longitudinal axis of the cylindrical housing, 36, and that of the tube, 30, coincides, and that the longitudinal axis of the dipole antenna intersects that of the tube housing at a point substantially in line with the base of the ultra-high frequency tube. A mounting flange, 40, provided with holes, 41, through which screws, 42, may be inserted, provides means by which the receiving unit may be secured to a coacting flange, not illustrated, on motor shaft 27, or means by which a similarly constructed transmitting unit may be secured to semaphore arm, 5. A watertight washer or disc, 43, may be placed between the flange, 40, and the coacting flange to effectively render a completely watertight unit. The leads for the unit may preferably be brought out through an opening at the center of the watertight washer, 43. Since the unit need only be moved through an angle of 90 degrees or less, a flexible cable, 44, may be employed to effect connections between the ultra-high frequency unit and the associated apparatus. In the transmitting unit provision may be made for mounting an additional ultra-high frequency tube 30a, shown in dotted lines, directly below tube 30 as illustrated in Figure 10. The two tubes may be thus arranged in a symmetrical parallel electrical connection, so that the current flow through the tubes is divided and the operating life thereby prolonged. Further, in the event of heater failure of one tube the second tube will ordinarily continue to generate sufficient radio frequency energy to effect the operative functions of the system. One preferred circuit for the generation and radiation of polarized ultra-high frequency energy is illustrated in Figure 11 in which the two quarter wave sections of a dipole 17, are connected to the anode and grid circuits, 45 and 46, respectively of the oscillator tube, 47. A variable condenser, 48, may be employed between the grid and anode circuits as shown to effect a degree of tuning. Anode and grid choke coils 49 and 50, respectively, are connected in series in the anode and grid leads of the oscillator tube as indicated. A resistor, 51, is connected in series between the grid choke 50 and ground. The cathode of tube 47 is connected to the grounded center tap of resistor 52, shunted across heater battery 53, or other source of E. M. F. A resistor, 54, and shunting condenser, 55, are connected in series between choke, 49, and an output terminal of alternator, 57, or other suitable source of anode E. M. F. A by-pass condenser, 58, is connected between the anode side of resistor, 54, and the cathode to complete the circuit. A relay 59 may be placed in series in one lead of battery 53 so as to effect on and off control of the transmitter in accordance with the operation of the railroad semaphore. It is evident that batteries need not be employed to supply the necessary power for the operation of the microwave transmitter since such power may be derived in any well known manner from connections with a lighting main or other power source.

In another preferred embodiment of the invention illustrated in Figures 12 to 22, inclusive, in which ultra-high frequency signal control of automobile traffic is effected, a microwave oscillator unit, 60, Figures 12 to 14, inclusive, with associated horizontal dipole radiator, 61, constructed in a manner similar to that heretofore described, is installed in a fixed position on the top of a conventional automobile traffic light housing, 63, as illustrated. In this position, the transmitting unit is so disposed that the longitudinal axis of the dipole, 61, is at right angles to the axis of the projected light rays from the correlated signal lights, 64 and 65. In this preferred embodiment of the invention, a plurality of control signals having different frequencies such as 100 and 500 cycles, for example, are employed to modulate the output of the ultra-high frequency oscillator in accordance with the correlated projection of traffic control lights of different colors as will be explained in more detail hereinafter. In this system, when the red light, 64, is in operation, the ultra-high frequency oscillator, 60, is modulated by a control signal having a frequency F1, of approximately 500 cycles for example, and when the green light, 65, is in operation, the oscillator is modulated by a control signal having a frequency F2 considerably different in frequency from that of F1, such as 100 cycles, for example. A motor vehicle, illustrated in Figure 15, equipped with a fixed horizontal dipole, 66, extending in a direction parallel to the axles of the car, and an ultra-high frequency detector 67, disposed as shown at the top of the car, will receive the respective ultra-high frequency traffic control signals from dipole radiator, 61, when the car is proceeding directly towards the correlated traffic lights as will be hereinafter explained.

To further increase the degree of usefulness of the invention, means may be provided by which a traffic officer may effect transmission of telephonic messages to the interior of a moving vehicle approaching an ultra-high frequency traffic signal transmitter, thereby providing motorists with traffic directions based for example on radioed instructions received from an aerial observer stationed above the city, and in a position to determine points of maximum traffic congestion, or to supply drivers with police department traffic dispatches, highway directions, time signals, or other intelligence. To effect these additional functions, a hand telephone set, 69, Figure 12, is provided in the signal control box, 70, for use in telephonically modulating the ultra-high frequency oscillator 60, or for use in conjunction with a police telephone communication system with which control box 70 is linked. By a switching arrangement in the control box, the ultra-high frequency oscillator may also be modulated by telephonic messages or signals from a central traffic control station if desired, or by a repeating sound-record reproducing device, such as a telegraphone 71, which may be used to provide highway directions and to give regulation traffic warnings such as "No turns on red lights" or "Do not proceed until green light flashes". The repeating telegraphone is particularly adapted to a function of this nature since the repeating mechanism is relatively simple, there is no damaging wear on the record, as would be the case should a phonograph disc or sound film be employed for continuous operation. In addition, the telegraphone possesses advantages over other devices in that the magnetically recorded intelligence on the wire or tape may be changed at will without the necessity of replacing the record. The cover, 72, of the signal control box, 70, bears control lever 73, as is common practice, so that the traffic lights may be controlled from the outside of the control box.

By reference to a preceding part of the specification relating to the varying response characteristics of an ultra-high frequency receiving dipole when disposed in different angular positions with respect to the transmitting dipole, and by particular reference to the diagram of Figure 16, it will be understood that a north or sound bound vehicle, equipped with a fixed horizontal dipole, 66, extending in a direction parallel to that of its transverse axis, and ultra-high frequency detector 67 with associated signal indicating devices such as neon light, 74, and loud speaker, 68, will receive an ultra-high frequency signal of maximum intensity from transmitting dipole, 61, installed on a traffic light, 63, disposed so as to control north-south traffic. If the traffic light is red, as indicated, a correlated modulating "stop" signal having a frequency F1 will be heard from loud speaker, 68, connected to an amplifier, 75, whose input is connected to the output circuit of detector, 67. The distinct and predetermined tone characteristic of the ultra-high frequency "stop" signal, accordingly, audibly informs the driver of the character of the traffic signal, even though the traffic light cannot be seen at the moment. A neon lamp 74, connected to the output of amplifier 75 will likewise be actuated and will give visual indication of the proximity of an ultra-high frequency traffic control signal device. Correspondingly, if the traffic light were green, the received ultra-high frequency "go" signal, having a predetermined and characteristic frequency F2, would be heard in a north or south bound car, and, by virtue of the distinctive tone of the "go" signal, the driver would be informed of the character of the traffic signal ahead of the car. An east or west bound car also equipped with a similar fixed horizontal receiving dipole, 76 and detector, 77, will, by virtue of the perpendicular relationship between the receiving dipole, 76, and the transmitting dipole, 61, simultaneously receive the ultra-high frequency signal from dipole, 61, with minimum signal intensity. Accordingly, a loud speaker 80, connected to the output of an amplifier, 79, whose input circuit is connected to detector, 77, will receive insufficient energy to permit its audible operation with the result that the particular ultra-high frequency traffic control signal correlated with the north-south traffic control device will not effectively be heard in the east bound or west bound vehicle whereas at the same moment it is clearly heard within a northbound or southbound vehicle at a point equidistant from the traffic control device. The ultra-high frequency signal will be received with increasing intensity in a north or south bound car until the traffic light, 63, is reached, after which the signal will diminish quickly because of the shielding effect of the car body.

To control traffic in the east-west lane, an additional traffic control light, 81, shown in dotted lines in Figure 16, may be installed at an adjacent corner, and a microwave oscillator, 82, with associated horizontal dipole radiator, 83, mounted thereon. It will be understood from the foregoing description and from the diagram that when traffic light 63 is projecting a red signal and a correlated ultra-high frequency modulating signal of frequency F1 to the south and north for reception by north bound and south bound vehicles respectively, traffic light, 81, is projecting a green light and a correlated ultra-high frequency signal of frequency F2 to the west and the east for reception by east and west bound vehicles respectively.

Since no mutual interference is caused by differently polarized waves from two ultra-high frequency transmitters of the type herein described and since the substantially aperiodic character of the detector input circuit does not require manual tuning in order to efficiently receive signals from horizontally polarized ultra-high frequency transmitters tuned to various wavelengths within a few centimeters of each other the system of applicant may comprise a multiplicity of ultra-high frequency transmitters in the same city operating on an assorted number of wavelengths in the vicinity of 50 centimeters without danger of mutual interference. The aperiodic characteristics of the ultra-high frequency receivers will permit the effective reception of any of these transmitters as long as the receiving dipole is substantially parallel to a given transmitting dipole. Moreover, because of the directional and selectively polarized characteristics of the radiated ultra-high frequency signals, the possibility of interference with other communication services such as television or broadcasting will be minimized. In addition, it is pointed out that an ultra-high frequency traffic control system of the type described herein is comparatively free from disturbances caused by static, electrical storms and other sources of electrical interference and is unaffected by weather conditions.

In the present preferred embodiment of the invention as outlined in the foregoing description, electrical coordination and cooperation between the operation of a given signal light and the emission of a horizontally polarized ultra-high frequency signal modulated by a particular frequency is effected in a comparatively simple manner as is illustrated in schematic form in Figure 17, in which ultra-high frequency oscillator, 60, provided with a horizontal dipole radiator, 61, constructed in a manner similar to that shown in Figures 9 and 10, and mounted on the top of the traffic light housing, is supplied with modulating electrical waves of frequency F1 or F2 or with speech-modulated waves from the output circuit of amplifier 84, whose input is connected to an oscillator 85, such as a vacuum tube or other suitable audio frequency oscillator, whose frequency of oscillation may be changed from one frequency, F1, to another frequency, F2, as may readily be accomplished in a well known manner in an oscillatory circuit by changing the value of condensers $C_1$ or $C_2$, or inductance, not shown, in the oscillating circuit. Changes in the value of such condensers or inductance of the oscillator are effected in the system of the invention as illustrated in Figure 17 by means of a single pole double throw switch 86 which, when on contact point 87 throws condenser $C_2$ into the oscillating circuit of oscillator 85, and when on contact point 88 throws condenser $C_1$ into the oscillating circuit, thereby changing the period of oscillation of oscillator 85 from one frequency F2 to a second frequency F1 respectively in accordance with the respective changes in the positions of the switch arm. Mechanical coupling between the frequency or tone control switch 86 and the traffic control light switch 89 may be provided by means such as shaft 90 as shown so that movement of the traffic control light switch arm 89 from contact point 91, which controls the lighting circuit of green signal lamp 92, to contact point 93, which controls red signal lamp 94, automatically effects the cooperative and correlated movement of switch arm 86 from contact point 87 to contact point 88, respectively, thereby effecting emission of an ultra-high frequency signal modulated by frequency F2 or F1 respectively in correlation to, and in cooperation with the projection of the green or red light respectively.

A present preferred ultra-high frequency transmitting circuit employed in experimental tests of the ultra-high frequency traffic control system is illustrated in Figure 18 in which the ultra-high frequency circuit arrangement and functioning of the dipole radiator 17, oscillator tube 47 and other associated parts of the oscillating circuit are identical to those shown in Figure 11. Modulation of the ultra-high frequency transmitter in this particular embodiment of the invention may be effected by any well-known speech modulating circuit such as the Heising circuit illustrated herewith in which the anode lead of the modulator tube 95 is connected in conventional manner to one end of constant current choke coil 96, disposed in series in the positive lead from a source of anode E. M. F. 97, and to the anode circuit of oscillator tube 47. Modulating signal voltage is supplied to the input circuit of the modulator tube through transformer 98 whose secondary leads are connected to the control grid and cathode leads of the modulator tube as shown. The primary winding of transformer 98 is connected to the output circuit of amplifier 84 whose input circuit is connected to the output circuit of control signal oscillator 85. The input of amplifier 84 is also connected by means of switching unit 99 to the output circuit of microphone 100 of hand telephone set 69 or to the output circuit of a repeating telegraphone 71, or to a telephone line 101 as desired. The control arm 73 of traffic signal control box 70, as described heretofore, effects control of operation of red and green signal lights 94 and 92, respectively, and simultaneously effects coordinated and correlated modulation of ultra-high frequency oscillator tube 47 by control signals of frequencies F1 and F2 respectively, thereby causing selective modulation of the emitted horizontally polarized ultra-high frequency radiant energy with correlated and cooperative projection of the signal lights.

A preferred embodiment of a simple form of ultra-high frequency receiving apparatus installed on a moving vehicle, such as an automobile particularly, and illustrated in Figures 19 to 21 inclusive employs an insulated horizontal receiving dipole 66 secured on the outside of the vehicle at a point just above the windshield 102 which location has a distinct advantage in that the receiving dipole is substantially in line of sight relation to the transmitting dipole regardless of the presence of other cars having steel bodies of moderate height in front of the receiving dipole. As pointed out heretofore, metallic structures reflect ultra-high frequency radiant energy and act as a shield through which ultra-high frequency energy do not readily penetate. It is desirable therefore to mount the receiving dipole at such a height that the presence of the steel body of a preceding automobile will not prevent the reception of the ultra-high frequency traffic control signal. Moreover, the location as depicted has an additional advantage in that the shielding effect of the body proper, on the front of which the dipole is installed, reduces signal pick-up from an ultra-high frequency transmitter which has been passed. The detector unit 67, shown in the illustration of Figure 19 with its cover removed, may be installed on the interior of the car at a point substantially adjacent to the mid point of the receiving dipole as indicated so that short leads between the dipole and the input circuit of the ultra-high frequency detector tube 30, are effected. The high frequency choke coils, 31 and 32, associated with the anode and grid leads, respectively of the detector circuit are also included in the housing of detector unit 67 as shown. The output circuit of detector tube 30 and power supply leads are placed in a shielded cable 103, indicated by dotted lines, which is connected to the proper input and power supply terminals of an amplifier unit 75. Visual signal indicating devices, such as a red neon lamp 104 and a green neon lamp 105, connected to suitable frequency selective devices, such as filters, not shown in Figure 19, operated by amplifier 75, are located in proximity to the instrument board of the vehicle and in the driver's line of vision as shown. A loud speaker 68 is disposed within the car at a point behind the instrument panel as shown or at any effective location, to give audible indication of the character of the traffic signal as heretofore described.

A circuit diagram of such an ultra-high frequency receiver with visual and audible signal indicating system is shown in Figure 21 wherein the ultra-high frequency detector circuit associated with tube 30 is identical to that shown in Figure 8. The secondary winding of amplifying transformer 35 is connected in well known manner to the input circuit of an amplifier tube 106, volume control being effected by a variable resistor 107 placed across the secondary windings of transformer 35 as shown. The output circuit of tube 106 is connected to an output transformer 108 in conventional manner and the secondary windings thereof employed to supply signal voltage to frequency selective devices 109 and 110, such as electrical wave filters tuned to respond selectively to received signals of frequency F1 or F2 respectively. The output circuits of filters 109 and 110 are connected to neon lamps 104 and 105, respectively, or to other suitable visual indicating devices. The output of transformer 108 is also connected to a loud speaker, 68, as shown, to give audible indication of the character of the traffic light towards which the car is approaching.

A simple modification of the ultra-high frequency receiving and signal indicating system is shown in the schematic diagram of Figure 22 in which the output of the ultra-high frequency detector unit 67 is supplied to a suitable input circuit, such as that of the first stage audio amplifier, of a conventional automobile broadcast receiver 111. Means are thereby provided by which the broadcast receiver may be easily adapted to receive horizontally polarized ultra-high frequency traffic control signals emitted by the horizontal transmitting dipole of the radio traffic control device as well as customary entertainment from broadcasting stations. Since the ultra-high frequency traffic control signal delivered to the audio frequency amplifier of the broadcast receiver will be heard from loud speaker 68 regardless of the broadcasting wave length to which the radio frequency and detector circuits of the broadcast receiver may be tuned, such a receiver, when approaching an ultra-high frequency traffic control transmitter, will, without tuning adjustments on the part of the driver, provide audible indication of the character of the traffic signal superimposed on the received broadcast program signal and when the traffic control light has been passed the signal from the broadcasting station alone will be received in a normal manner. By connecting the input circuits of suitable frequency selective devices, such as sharply tuned electrical wave filters 109 and 110 of proper design, shown in dotted lines, to the output of the broadcast receiver as indicated in Figure 22, selectively operated visual signal indicators, such as neon lamps 104 and 105, may be visibly actuated by the output voltage of filters 109 and 110, respectively, to give visual indication of the exact character of the traffic lights ahead of the car.

In a modification of the present preferred embodiment of the invention, illustrated in Figures 23 and 24, particularly adapted to a railroad signal light system, the microwave oscillator 60 and associated horizontal dipole antenna 61 arranged in a protective housing similar to that shown in preceding figures, are disposed on legs 112 secured to the top of the supporting member 113 of the signal device wherein are embodied a plurality of signal lights, such as red light 114 and green light 115. A curved metallic reflector 116 is installed at the rear of oscillator unit 60 to act as a means for directing and concentrating the emitted wave energy from dipole 61 in the direction of projection of lights 114 and 115. The reflector also serves as a shield to prevent the projection of ultra-high frequency energy in a direction opposite to that of the projected light rays from the correlated signal lights. A weatherproof transmitter housing, 117, fabricated from glass, porcelain, Bakelite or other suitable material supported by braces 118 is disposed around oscillator unit 60 and its associated dipole radiator 61 as shown to completely shield the oscillator and antenna from damaging effects of severe storms and to prevent accumulations of ice and excessive moisture from forming on dipole radiator 61. An electrical heating coil 119 may be disposed as shown within housing 117 to serve as a means for holding the temperature within the housing at a point high enough to prevent the formation of ice on the outside surface of the housing and also as a means to prevent the accumulation of moisture on the transmitting unit. In order to permit transmission of telephonic messages to the interior of a locomotive equipped with ultra-high frequency receiving apparatus of the type previously described, a hand telephone set 69, similar to that of Figure 12, is provided within control box 70 which also embodies ultra-high frequency signal control oscillator 85, amplifier 84, and switching means 99, arranged in electrical circuits identical to those of Figure 18. Connections with a railroad telegraph or telephone system are also provided within housing 70 to provide a means of communication between a central traffic station and the interior of the cab of the locomotive in a manner similar to that described heretofore in that part of the specification pertaining to the illustrations of Figures 12 and 18. A storage battery, not illustrated, installed in a weatherproof housing 120 may be provided as an emergency source of power supply to insure the actuation of the ultra-high frequency signal system independent of the power supply means employed to operate lights 114 and 115. A small battery-driven motor generator unit, not illustrated, or other suitable source of anode potential may be installed in housing 121, adjacent to battery housing 120.

The operation of the ultra-high frequency signalling system of Figures 23 and 24 is identical to that of the ultra-high frequency system illustrated in Figure 18. When signal light 114 is in operation, an ultra-high frequency signal modulated by a control signal having a frequency F1 is emitted by dipole radiator 61 and when light 115 is in operation, the ultra-high frequency signal is modulated by a control signal of frequency F2, F1 and F2 corresponding to the red and green signal lights, respectively. The ultra-high frequency signals are received and visual and audible indication of the character of the railroad signals are provided in the cab of a locomotive equipped with a horizontal receiving dipole and ultra-high frequency detector with associated signal indicating equipment similar to that described heretofore in that part of the specifications related to the diagram of Figure 21.

A modification of the ultra-high frequency railroad signal transmitting system shown in Figures 23 and 24 is illustrated in Figures 25 to 28 inclusive, wherein one set of railroad signals 122 and 123, Figure 25, disposed so as to effect control of northbound traffic on track A, Figure 28, employs an ultra-high frequency oscillator 60 with horizontal dipole radiator 61 disposed in front of a curved reflector 124. A second set of railroad signals, 125 and 126, Figures 26 and 27, disposed so as to effect control of northbound traffic on parallel track B, Figure 28, employs an ultra-high frequency oscillator 127 with vertical dipole radiator 128 disposed in front of curved reflector 129 as shown. In this embodiment of the invention, a modulating signal oscillator similar to that of 85, Figure 18, for generating signalling frequencies F1 and F2, and amplifying and modulating means similar to those shown in Figure 18, may be installed in a housing such as that shown at 130, Figure 27, secured to the bottom of the signal light housing. Adequate support for and spacing between the ultra-high frequency oscillator such as 127 and reflector 129, is effected by means of an extension arm such as 131, clearly shown in Figure 27, secured to housing 130. Arm 131, preferably in the form of a pipe also encloses power supply and signal cables connecting the oscilator unit 127 with its modulator in housing 130.

The operation of the devices shown in Figures 25 to 27 inclusive is similar to that of the devices shown in preceding figures with the exception that dipole radiator 61 emits a horizontal polarized wave modulated by the signal frequency correlated with lights 122 and 123, and dipole radiator 128 emits a vertically polarized wave modulated by signalling frequencies associated with lights 125 and 126, thereby projecting two ultra-high frequency signals having different polarization characteristics along parallel tracks A and B. A northbound locomotive C, Figure 28, equipped with an adjustable receiving dipole 133 disposed in an operative horizontal direction and provided with an ultra-high frequency detector, 136, and associated traffic signal receiving apparatus embodied in the invention as illustrated in the preceding figures, will receive with maximum intensity only the ultra-high frequency signals from horizontal dipole radiator 61 by virtue of the parallel relationship between the transmitting and receiving dipole as previously explained. In like manner another northbound locomotive, D, Figure 28, proceeding in a parallel track B, equipped with an adjustable receiving dipole 134 disposed in a vertical direction and provided with a detector, 136*a*, and associated signal indicating apparatus will receive with maximum intensity only the ultra-high frequency signals from vertical dipole radiator 128. Comparatively simple means are thereby provided with which selective ultra-high frequency transmission, on a common wavelength if desired, may be effected between railroad signal devices controlling traffic on adjacent and parallel tracks and moving vehicles proceeding thereon.

One preferred arrangement of ultra-high frequency receiving apparatus suitable for use in connection with the system of Figures 25 to 28 inclusive, is shown in Figures 29 to 31 inclusive. The adjustable receiving dipole, shown in horizontal position at 135, Figure 29, is connected to an ultra-high frequency detector unit, 136, both units 135 and 136 being installed near the top and at the front of the cab of a locomotive as indicated. The demodulated output of detector unit 136 is supplied, as schematically shown in Figure 30, to the input circuit of an amplifier 137. The output of amplifier 137 is connected to a loud speaker, 138, as shown, and to the input circuits of electrical wave filters, 139, 140 and 141, preferably of the tuned reed type, each tuned to a predetermined signal control frequency as F1, F2 and F3, respectively. The output circuits of the filters, 139, 140 and 141, are connected to signal lights 142, 143 and 144, respectively, installed in proximity to the instrument board of the locomotive. Means are thus provided by which a plurality of control signals each having a different predetermined frequency value, such as F1, F2, F3, as well as telephonic signals emitted by an ultra-high frequency transmitter of a type such as that shown in Figure 25, may be received in the cab of the locomotive by ultra-high frequency detector 136 and thereafter separated by suitable filter devices into the constituent modulating control signals of frequency F1, F2 and F3 to effect selective visual energization of signal lights of different colors as well as audible reception of the traffic control and speech signals.

A circuit diagram for such an ultra-high frequency receiving and signal indicating system is shown in Figure 31 in which the output circuit of ultra-high frequency detector unit 136, similar to that of Figure 21, is connected to the primary windings of amplifying transformer 35 disposed in series in the positive plate battery lead. The secondary windings of transformer 35 are connected in well known manner to the input circuit of amplifier 137 whose output is connected to loud speaker 138 and the exciting coils of tuned reed filters 139, 140 and 141. The output coils of filters 139, 140 and 141 are connected to the input circuits of amplifiers 146, 147 and 148, respectively, whose respective output circuits are connected to the windings of relays 149, 150 and 151 respectively as shown. The armature contacts of relays 149, 150 and 151 are connected in series with electric lamps 142, 143 and 144 respectively, and a source of electric potential such as a storage battery, 152, as shown. It is obvious that a time delay relay, 28, and a power and brake control relay, 29, may be added if desired to the circuit of red lamp 142 so as to bring the train to a stop should the brake not be applied within a predetermined time after the stop signal has been energized.

The operation of the circuit shown in Figure 31, is such that when an incoming modulating signal, having a control frequency F1, for example, is supplied to amplifier 137, the amplified signal is delivered to the exciting coils of tuned reed filters 139, 140 and 141. The tuned metallic of filter 139 which is tuned to respond to predetermined signalling frequency F1, is forced into sustained vibration by the signal voltage in the exciting coils having frequency F1 and a small voltage is thereby induced in the output coils of the filter unit in well known manner. The filtered output voltage is then supplied to the input circuit of amplifier 146 whose output voltage causes the actuation of relay 149 and the subsequent closing of the lighting circuit of red lamp 142 as may be understood readily from the circuit diagram. Since the tuned reeds of filters of 140 and 141 are not forced into vibration by the applied signal voltage of frequency F1 no voltage is induced in the output coils of these filters, and consequently no actuating current is supplied to relays 150 and 151 controlling the operation of lamps 143 and 144 respectively. It is further pointed out that a sustained electrical wave of given frequency such as F1 is necessary to effect sufficient vibration of the reeds of the filter units to induce an operative voltage in the output coils of the filters. Thus reception of speech modulated signals of constantly varying frequency and amplitude does not interfere with the operation of the visual signal indicating means. Moreover, as tuned reed filters of the type described are extremely selective with regard to frequency response characteristics they thereby effect the rejection of all but the proper control signals in the output circuits of the filter units.

For a better and further understanding of the nature of my invention utilizing the polarized characteristic of ultra-high frequency energy in signaling systems, reference is made to my copending application Serial No. 228,051 filed September 1, 1938, entitled Radio traffic control system, which is a continuation-in-part of the instant application. For a further and better understanding of my invention as applied to the receiving apparatus employed by vehicles and embodying my invention, reference is made to my copending application Serial No. 228,052 filed September 1, 1938, entitled Ultra-high frequency receiving system, as a continuation-in-part of the instant application. While ultra-high frequencies are specifically mentioned herein, it is to be understood that lower frequency carriers may be used to obtain the desired results.

It will be recognized that the illustrative systems described herein are capable of considerable modification and rearrangement without departing from the spirit and scope of the invention, and it is therefore to be understood that the following claims embrace all such modifications and equivalent arrangements as may fairly be construed to fall within the scope of the invention.

What I claim as new and desire to secure by Letters Patent of the United States is as follows:

1. In a system for controlling the movement of vehicular traffic, a traffic control device having a plurality of distinctively colored traffic signal lights disposed so as to effect control of traffic in a particular lane, a radio transmitter for effecting spacial transmission of an emitted radio wave along said lane, a control signal generator for modulating said radio wave by a signal having a frequency F1 when one of said distinctively colored traffic signal lights of said traffic control device is in operation and by a signal having a frequency F2 when another of said distinctively colored traffic signal lights of said traffic control device is in operation, a switch to select for actuation one or the other of said traffic signal lights and simultaneously to select the frequency of said control signal associated with said traffic signal light, and a radio receiver disposed on a vehicle proceeding in said lane, said receiver having attached thereto correspondingly colored signal lights controlled by frequency discriminating devices connected so as to effect actuation of either of said lights dependent on the particular frequency of the signal modulating said radio wave.

2. In a traffic control system in combination with sets of traffic signal lights for projecting light rays of distinguishing color characteristics, circuit means for selectively energizing said traffic signal lights to effect projection of light rays having a desired color characteristic, a radio transmitter for radiating radio energy waves in space in the direction of projection of said light rays, a control signal generator for modulating said radio transmitter with a plurality of control signals, means for changing the frequency of said signal generator to effect a particular modulation of said transmitter with a control signal simultaneously with projection of light rays having a particular color characteristic, radio receiving apparatus mounted on a vehicle and responsive to said radio energy waves, and visual signal indicators corresponding in color with the colors of said traffic signal lights controlled by said receiving apparatus and operative simultaneously and in correlation with the operation of said traffic signal lights.

3. In a traffic control system, sets of traffic signal lights, means controlling the projection of light rays from said sets of traffic signal lights for directing traffic movements in different lanes, a radio transmitter, means for emitting radio wave energy in a direction parallel to that of said light rays from said sets of traffic signal lights, a control signal generator, means for controlling the frequency of said generator, means for modulating said radio energy by said generator, means coordinating a particular frequency of said generator with the operation of a given set of said traffic lights, and means mounted on a vehicle for reproducing in similitude the signalling characteristics of said sets of traffic signal lights, said last mentioned means being operative under control of the radio wave energy emitted by said transmitter.

4. A radio traffic signalling system for controlling the movement of vehicular traffic along fixed intersecting or parallel lanes comprising in combination visible "stop" and "go" signals for effecting visual signal control of traffic along a particular lane of traffic, an ultra-high frequency radio transmitter provided with a horizontal dipole antenna extending in a direction normal to that of said lane so as to effect directional spacial transmission of an emitted radio wave along said lane, a tone signal generator for modulating said transmitter with tone signals having different frequencies, a tone selection switch for effecting modulation of said transmitter by different tones of definite frequency, one of said tones corresponding to a "stop" signal and another of said tones to a "go" signal, a master signal control switch for selecting for actuation one or the other of said visible "stop" and "go" signals in accordance with a desired traffic movement along said lane of traffic and simultaneously to actuate said tone selection switch to effect modulation of said transmitter by one or another of said tones depending on which visible light is being actuated, and an ultra-high frequency radio receiver disposed on a vehicle proceeding in said lane of traffic, said receiver having a horizontal dipole antenna for receiving said tone signals from said transmitter, the longitudinal axis of the receiving antenna extending in a direction normal to the direction of movement, said receiver also having attached thereto tone discriminating devices and "stop" and "go" signal indicating devices actuated by said receiver, one or the other of said indicating devices being actuated dependent on the particular tone signal being received.

5. In a radic traffic control system, in combination, traffic lights and a housing therefor supported in elevated position with respect to a given traffic lane, radio trnasmission means adjacent to said housing and arranged for establishing a radiation field mainly along said traffic lane for approaching traffic from the preceding intersection, and means for periodically and synchronously transmitting traffic control beam signals from said traffic lights and said radio transmission means.

6. In a system for controlling the movement of vehicular traffic, a traffic control device having a multiplicity of distinctively colored visual signal lights disposed so as to effect control of traffic in a particular lane, a radio transmitter having an antenna disposed so as to effect spacial transmission of a radio wave mainly along said lane for approaching traffic, means for modulating said radio wave by a distinctive signal having a frequency F1 when one of said distinctively colored visual signal lights is in operation and by a distinctive signal having a frequency F2 when another of said distinctively colored visual signal lights is in operation and a radio receiver mounted on a vehicle proceeding in said lane, said receiver having connected therewith distinctively colored signal lights corresponding to the signal lights in said traffic control device and demodulation means responsive to control signals of frequencies F1 and F2 for selectively actuating a signal light in said receiver corresponding to an individual one of said first mentioned signal lights in said traffic control device.

7. In a radio traffic control system, in combination, traffic lights and a housing therefor supported in elevated position with respect to a given traffic lane, a radio transmission means adjacent to said housing and arranged for establishing a radiation field mainly along said traffic lane for approaching traffic, the position of said radio transmission means being a factor in the pattern of the radiation field established along said traffic lane, and means for periodically and synchronously transmitting traffic control beam signals from said traffic lights and said radio transmission means.

8. In a traffic-signalling system, a radio transmitter; means including said radio transmitter for emitting directive signals effective solely within a specific traffic zone along a lane of traffic; means for modulating said radio signals in accordance with predetermined traffic signalling conditions; a radio receiving apparatus mounted on a vehicle; signalling devices connected to said radio receiver; and means including said radio receiver responsive to said received radio signals for operating said signalling devices in said moving vehicle.

9. In a traffic signalling system, in combination with traffic signalling means for guiding traffic along predetermined lanes; a radio transmitter for radiating signals effectively substantially within a specific traffic zone along a lane of traffic; a switching device for synchronously operating said traffic signalling means and said radio transmitter whereby said transmitter synchronously radiates signals corresponding to the operation of said traffic signalling means; a radio receiving apparatus mounted on a vehicle; and means in said radio receiver selectively responsive to said received radio signals from said transmitter for simulating said first mentioned traffic signals in said vehicle in response to said received radio signals.

10. In a traffic signalling system, a radio receiving system for vehicles comprising in combination, a radio receiver mounted on a vehicle for receiving traffic control signals of different modulation frequencies propagated towards said vehicle, an amplifier connected to said receiver, a plurality of frequency discriminating means connected to said amplifier and individually responsive to signal energy of said different modulation frequencies, a relay connected to each of said frequency discriminating means, and a signal light connected to each of said relays, each signal light being energized by the action of its associated relay in accordance with the selective operation of the respective frequency discriminating means for directing the movement of said vehicle in traffic in accordance with said traffic control signals.

11. In a traffic signalling system for vehicles proceeding in a particular traffic signalling zone along a lane of traffic, means for establishing an effective radiation field within said signalling zone, means for generating a signal carrier of definite frequency for reception in vehicles solely within said lane of traffic, and means for modulating said carrier with a plurality of control signals of different predetermined frequencies, one of said frequencies being correlated with a "go" signal and another of said frequencies being correlated with a "stop" signal.

12. In a traffic signalling system, a signal transmitter for effecting transmission of a carrier signal effective substantially within a predetermined signalling zone along a lane of traffic; means for modulating said transmitter with a control signal having frequencies within a specific predetermined band, means for modulating said transmitter with speech signals having frequencies within a second predetermined band; a signalling translating device responsive to said first mentioned frequency band and a speech device responsive to said second predetermined frequency band, including frequency discriminating means for selectively operating said first and second mentioned signal translating devices within a vehicle.

13. A traffic signal receiving device for providing visual and audible traffic control signals within a vehicle comprising a radio receiver for receiving aural and visual signals having individual frequency band characteristics; a frequency discriminating means connected to the output circuit of said radio receiver and comprising a loud speaker and a visual indicating means independently responsive to individual frequency bands applied thereto by said frequency discriminating means for individually providing audible and visual traffic signals within the vehicle.

14. In a traffic signalling system, a traffic control switching mechanism having a predetermined sequential operation; a source of carrier current; means for permitting said carrier current to be effective substantially within a predetermined signal zone along a lane of traffic; means for modulating said source of carrier current in accordance with a predetermined frequency indicative of a predetermined traffic signalling condition; means for modulating said carrier current in accordance with a second frequency indicative of a second predetermined traffic signalling condition, said first and second modulating means being selectively and sequentially controlled by said switching mechanism.

15. In a traffic signalling system, a traffic control switching mechanism, traffic control signalling lights selectively operated by said switching mechanism for indicating stop and go; a transmitter for emitting a carrier frequency effective substantially within a predetermined zone along a traffic lane; means for selectively modulating said carrier frequency in accordance with the operation of said switching mechanism; and aural receiving means selectively operable in accordance with said received modulated carrier frequency for producing aural indications corresponding to said traffic control signal indications to indicate stop and go in accordance with the tonal value of said received signals.

16. In a traffic signalling system, a traffic control switching mechanism; a source of carrier current; means for modulating said source of carrier current in accordance with a predetermined audio frequency indicative of a predetermined traffic signal condition; means for modulating said carrier current in accordance with a second audio frequency indicative of a second predetermined traffic signal condition, said first and second modulating means being selectively controlled by said switching mechanism; means for receiving said modulated signals; a first aural signal device responsive to said first audio frequency; and a second signalling device responsive to said second audio frequency.

17. In a traffic signalling system for controlling the flow of surface traffic within a restricted signalling zone along a lane of traffic, a traffic control switching mechanism, a source of carrier current, means for modulating said source of carrier current by a definite predetermined audio frequency indicative of a "go" signal, and means for modulating said source of carrier current by a second definite predetermined audio frequency indicative of a "stop" signal, said modulating means being selectively controlled by said traffic control switching mechanism to effect modulation of said source of carrier current by said first and second audio frequencies in a definite "stop" and "go" traffic signalling sequence.

18. In a carrier-wave signaling system for controlling the flow of traffic along the surface of a roadway, traffic signal receiving apparatus for effecting selecting sequential actuation of visual "stop" and "go" signal indicators in accordance with the sequential reception of particular "stop" and "go" traffic control signals of predetermined modulating frequencies selectively and sequentially impressed upon a carrier wave from a control transmitter, said traffic signal receiving apparatus, including, in combination, means for demodulating a carrier wave upon which one of the other of said "stop" and "go" traffic control signals has sequentially been impressed, frequency discriminating means electrically connected to said demodulating means for electrically discriminating between said control signals in accordance with their respective modulating frequencies, and visual "stop" and "go" signal indicating means selectively and sequentially operable by one or the other of said control signals as determined by the modulation frequency characteristic of the received signal, said visual "stop" and "go" signal indicating means having individual distinguishing visual characteristics.

19. In a carrier wave signaling system for controlling the flow of traffic along the surface of a roadway, traffic signal receiving apparatus for effecting selective actuation of aural and visual "stop" and "go" signal indicating means in accordance with the sequential reception of particular "stop" and "go" traffic control signals of predetermined modulating frequencies impressed upon a carrier wave from a control transmitter, said traffic control receiving apparatus including, in combination, means for demodulating a carrier wave upon which one or the other of said "stop" and "go" control signal has sequentially been impressed, amplifying means connected to said demodulating means for effecting amplification of said received control signals, sound reproducing means electrically connected to the output circuit of said amplifier for providing an aural indication of reception of said "stop" and "go" traffic control signals, frequency discriminating means connected to the output circuit of said amplifier for electrically discriminating between said "stop" and "go" control signals in accordance with their respective modulating frequencies, and visual "stop" and "go" signal indicating means selectively and sequentially operated by one or the other of said control signals as determined by the modulation frequency characteristics of the received signal, said visual "stop" and "go" signal indicating means having individual distinguishing visual characteristics.

20. In a traffic signaling system for effecting electric wave signaling within a predetermined zone along a lane of traffic, a carrier wave transmitter for establishing electric wave signaling to traffic proceeding within said specific signaling zone, said transmitter having an audio frequency signal input circuit, a sound-record bearing medium having thereon a record of predetermined signalling intelligence directed to traffic in said zone, and sound-record reproducing means electrically connected to the input circuit of said transmitter for utilizing said sound-record bearing medium to provide an electrical signal corresponding to said recorded signaling intelligence, said electrical signal being impressed on said transmitter input circuit to effect modulation of the carrier wave energy emitted by said transmitter.

WILLIAM S. HALSTEAD.